United States Patent
Nocek

[11] 3,769,845
[45] Nov. 6, 1973

[54] GEAR DRIVE FOR A GYRO CONTROLLED ATTITUDE INDICATOR

[75] Inventor: Stanley J. Nocek, Clifton, N.J.

[73] Assignee: The Bendix Corporation, Teterboro, N.J.

[22] Filed: June 25, 1971

[21] Appl. No.: 156,636

[52] U.S. Cl. .................................. 74/5 R, 33/204 C
[51] Int. Cl. ............................................ G01c 19/16
[58] Field of Search .................... 33/204 C; 74/5 R, 74/5.7; 244/79

[56] References Cited
UNITED STATES PATENTS

| | | | |
|---|---|---|---|
| 2,940,176 | 6/1960 | Jessup | 33/204 C |
| 2,492,992 | 1/1950 | Handel | 33/204 C |
| 2,912,766 | 11/1959 | Hurlburt | 33/204 C |
| 3,032,886 | 5/1962 | Hurlburt | 33/204 C |

FOREIGN PATENTS OR APPLICATIONS 918,604  10/1946  France .............................. 33/204 C

*Primary Examiner*—Manuel A. Antonakas
*Attorney*—Anthony F. Cuoco

[57] ABSTRACT

A gyro indicating instrument includes an indicating sphere geared to a gyro through a planetary gear arrangement for being displaced in accordance with the pitch attitude of an aircraft. The gear arrangement includes external backlash adjustment means for eliminating sphere jitter.

3 Claims, 2 Drawing Figures

1

GEAR DRIVE FOR A GYRO CONTROLLED ATTITUDE INDICATOR

CROSS REFERENCE TO RELATED PATENTS AND APPLICATIONS

This invention is an improvement over the devices described in U.S. Pat. No. 2,912,766 issued Nov. 17, 1969 to Charles E. Hurlburt and in U.S. application Ser. No. 8,583, filed Feb. 4, 1970 by D. F. Carey, and now abandoned both of which inventions are assigned to The Bendix Corporation, assignee of the present invention.

BACKGROUND OF THE INVENTION

1. Field of the Invention

This invention relates generally to gyro controlled pitch attitude indicators for aircraft and, particularly, to planetary gearing for coupling an indicating sphere to the gyro. More particularly, this invention relates to gearing of the type described including external backlash adjustment means.

2. Description of the Prior Art

Gyro controlled pitch attitude indicators are well known in the art. A typical instrument of this type is described in the aforenoted U.S. Pat. No. 2,912,766. These instruments use a gearing arrangement whereby an indicating sphere is driven by a vertical gyro, with the gyro and sphere having different pitch spin axes. In order to provide greater clearance between the gyro and the sphere so that a larger gyro may be used for increased accuracy, a planetary gearing arrangement has been used whereby the sphere and gyro have a common pitch spin axis. A device of this latter type is described in the aforenoted U.S. application Ser. No. 8,583.

A particular problem that the instrument designer has been faced with when using the planetary gearing arrangement is sphere "jitter," i.e., uneven or unsmooth sphere displacement, which detracts from the attitude indication. This jitter has been found to be directly related to backlash in the gearing arrangement. Prior to the present invention, a predetermined amount of backlash had to be assembled into the mechanism, or alternatively, gears were interchanged to provide the desired result. In either event the disadvantages are obvious.

SUMMARY OF THE INVENTION

The device of the invention eliminates the aforenoted disadvantages and provides external backlash adjustment means for the planetary gearing arrangement. The invention contemplates an internal ring gear affixed to the gyro and a pair of spring loaded split sun gears affixed to the sphere. A planetary gear is arranged between the ring gear and the sun gears for transmitting gyro controlled motion of the ring gear to the sun gears for displacing the sphere in accordance with the pitch attitude of an aircraft. The planetary gear is mounted in an eccentric housing which is displaceable so that the planetary gear may be moved away from the sun gears toward the ring gear and locked in position to minimize backlash between the planetary gear and the ring gear without affecting backlash between the split gears and the planet gear.

One object of this invention is to provide backlash adjustment for a planetary gear arrangement coupling a gyro to an indicating sphere controlled by the gyro.

Another object of this invention is to provide backlash adjustment for a planetary gear arrangement including an internal ring gear, a pair of split sun gears and a planet gear in meshing engagement with the split gears and the ring gear. The planet gear is mounted in an eccentric housing for adjusting backlash between the planet and ring gears without disturbing that between the planet and sun gears.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
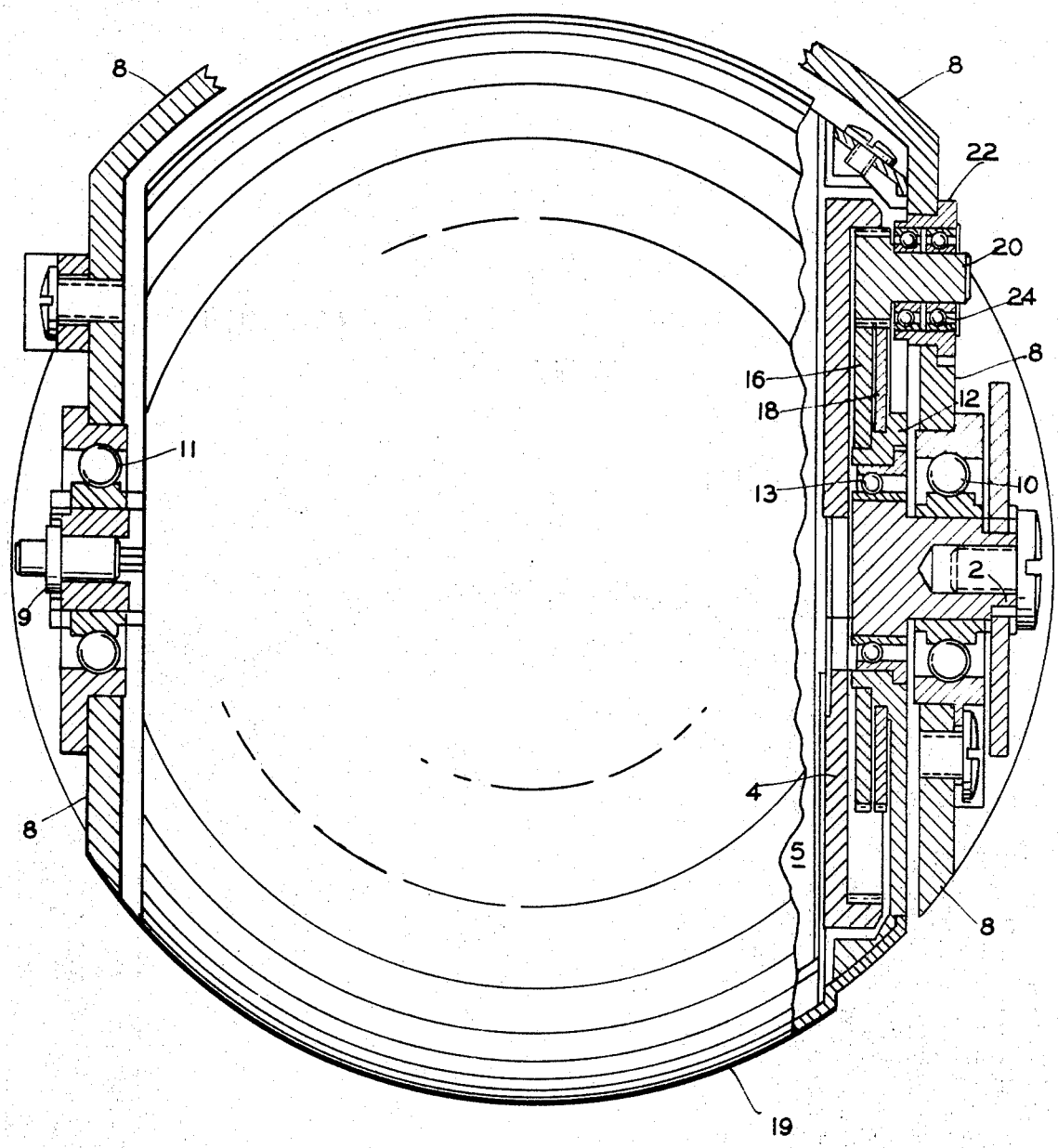
FIG. 1 is a top view of an arrangement according to the invention.

With reference to FIG. 1, there is shown an internal ring gear 4 affixed to a vertical gyro 5 by a trunnion 2. Gyro 5 is located within a sphere 19. Trunnion 2 and a trunnion 9 extend from opposite sides of sphere 19. Trunnions 2 and 9 are supported for rotation in a gyro yoke 8 by bearings 10 and 11, respectively.

Sphere 19 is mounted on a pair of opposed brackets 12, only one of which is shown, which support the sphere in its interior forward and polar regions. The brackets have bearings such as bearing 13, so that sphere 19 is rotatable about a horizontal axis defined by trunnions 2 and 9 to indicate the pitch attitude of an aircraft. In this connection, sphere 8 may include markings (not shown) for indicating aircraft bank and pitch attitude when the sphere is displaced. The sphere displacement is controlled by the gyro as is well known in the art and more fully described in the aforenoted U.S. Pat. No. 2,912,766 and U.S. application Ser. No. 8,583.

A pair of split sun gears 16 and 18, spring loaded to reduce backlash, are mounted on bracket 12 so that the sun gears are within ring gear 4. Gear 16 is fixed and gear 18 is free for rotation with sphere 19 about the horizontal axis. A planet gear 20 is journaled in a housing 22 by a bearing 24. Housing 22 is movably mounted in yoke 8.

It will now be understood that planet gear 20 meshes with ring gear 4 and split sun gears 16 and 18 so that movement of gyro 5 about its pitch axis causes ring gear 4, through planet gear 20, to drive sun gear 18 in a reverse direction, thereby driving sphere 19 in a reverse direction. The gear ratio between ring gear 4 and sun gear 18 is of a suitable value to provide mechanical amplification of the displacement of gyro 5 to sphere 19.

The novel feature of the invention is directed toward minimizing backlash between planet gear 20 and ring gear 4 without affecting the backlash between split gears 16 and 18 and planet gear 20. This backlash must be minimized to eliminate jitter of sphere 19 as may occur when the sphere is driven by the gyro as aforenoted. To this end, housing 22 is eccentric and is arranged in yoke 8 for displacement between 0° and 90°, thus pulling planet gear 20 away from gears 16 and 18 and toward ring gear 12. This permits minimization of backlash between gears 4 and 20 without affecting the backlash between gears 16 and 18 and gear 20.

Figure 2:
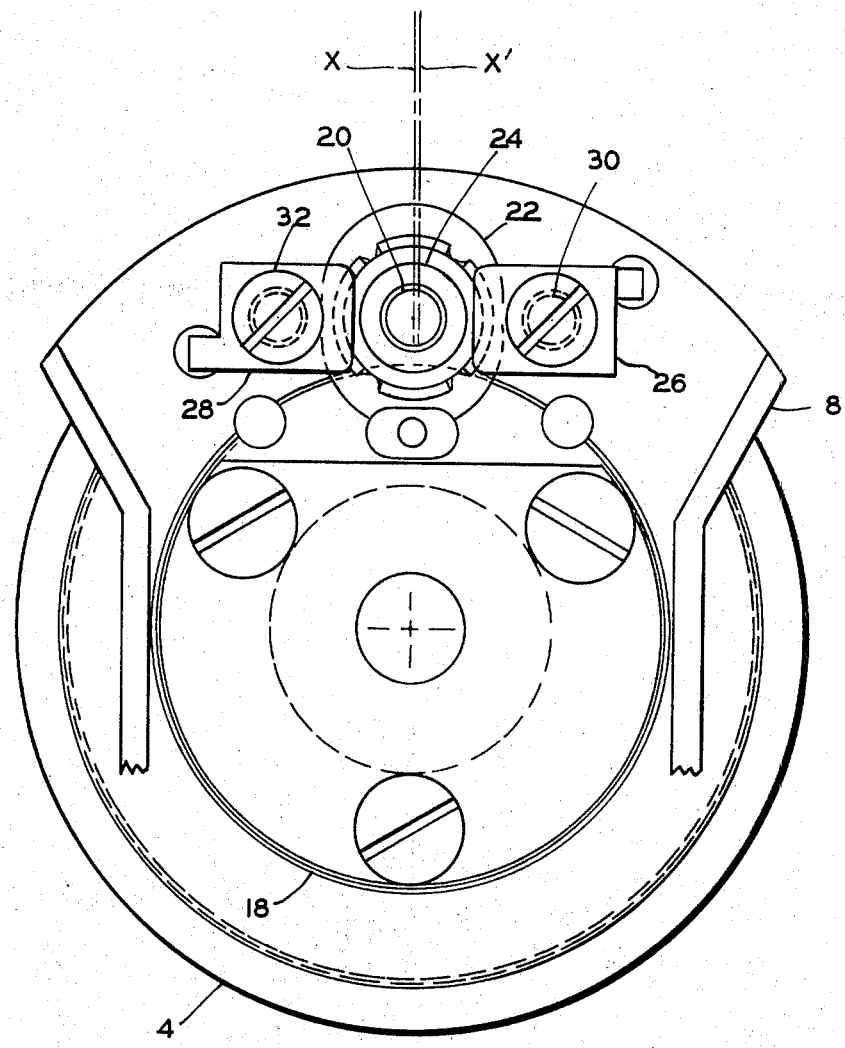
FIG. 2 is a side view of the arrangement shown in FIG. 1, and particularly showing the eccentric housing for adjusting backlash according to the invention.

This novel feature of the invention is best illustrated with reference to FIG. 2. Thus, eccentric housing 22 having a center line X' is secured in place by a pair of clamps 26 and 28 mounted to yoke 8 by screws 30 and 32 and carries, through bearing 24, gear 20 having a centerline X displaced from centerline X'. Loosening of the screws permits displacement of the housing for providing the aforenoted adjustment, after which the screws are tightened to clamp the eccentric housing in its adjusted position to provide the backlash as aforenoted.

It will now be seen that the heretofore noted objects of the invention have been satisfied. Backlash between planetary gear 20 and ring gear 4 is accomplished without affecting the backlash between split gears 16 and 18 and planet gear 20. The backlash adjustment is made externally and without costly disassembly and reassembly. The costly and time consuming procedure of matching gears to produce the desired backlash is eliminated.

While one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. For use with an instrument, a gyro responsive to a condition and a condition indicating member, a gearing arrangement comprising:
   a ring gear affixed to the gyro;
   a pair of spring loaded split sun gears affixed to the indicating member;
   a planetary gear arranged between the ring gear and the sun gears and in meshing arrangement therewith, and transmitting gyro controlled displacement of the ring gear to the sun gears to displace the indicating member in a direction opposite to the direction of displacement of the gyro to indicate the condition; and
   a housing supporting the planetary gear in eccentric arrangement, and displaceable to move the planetary gear away from the sun gears and toward the ring gear to minimize backlash between the planetary gear and the ring gear without affecting backlash between the sun gears and the planetary gear.

2. A gearing arrangement as described by claim 1, wherein:
   the ring gear has internal teeth; and
   the planetary gear has external teeth in meshing engagement with the internal teeth of the ring gear.

3. A gearing arrangement as described by claim 1, wherein:
   the gyro includes a yoke;
   the housing for supporting the planetary gear is adjustably mounted in the yoke; and
   a pair of claimps are carried by the yoke for securing the housing in an adjusted position.

* * * * *